United States Patent [19]
Laurence et al.

[11] 3,873,608
[45] Mar. 25, 1975

[54] HENKEL REACTION CONDITIONS
[75] Inventors: Patrick T. Laurence; Henry Shuttleworth, both of Pointe-a-Pierre, Trinidad
[73] Assignee: Texaco Trinidad, Inc., Pointe-a-Pierre, Trinidad
[22] Filed: Nov. 20, 1972
[21] Appl. No.: 308,196

Related U.S. Application Data
[63] Continuation-in-part of Ser. No. 69,456, Sept. 3, 1970, abandoned.

[52] U.S. Cl. ............................................. 260/515 P
[51] Int. Cl. ............................................. C07c 63/38
[58] Field of Search ................... 260/515 P, 525 US

[56] References Cited
UNITED STATES PATENTS
3,243,458    3/1966    Melchiore et al.................. 260/525
3,671,578    6/1972    Ogata et al...................... 260/515 P

*Primary Examiner*—Lorraine A. Weinberger
*Assistant Examiner*—Michael Shippen
*Attorney, Agent, or Firm*—Thomas H. Whaley; Carl G. Ries

[57] ABSTRACT

Potassium 2,6-naphthalene dicarboxylate can be isolated from a Henkel reaction mixture in which it occurs together with potassium carbonate, potassium naphthoate and other potassium dicarboxylates by extracting the other potassium salts with an extract system comprising a major amount of water soluble organic solvent and a minor amount of water, the extract system is evaporated and the extracted salts are recycled to the rearrangement to form additional product.

5 Claims, No Drawings

HENKEL REACTION CONDITIONS

CROSS REFERENCE TO COPENDING APPLICATION

This application is a continuation-in-part of commonly assigned copending application Ser. No. 69,456 filed Sept. 3, 1970, and now abandoned.

BACKGROUND OF THE INVENTION

1. Field of the Invention

This invention relates to the production of dipotassium naphthalene 2,6-dicarboxylate.

Naphthalene dicarboxylic acids currently are of interest as starting materials in the production of condensation polymers and in particular in the preparation of poly(ethylene-2,6-naphthalene dicarboxylate). What makes this polymer of considerable interest is its improved radiation stability, the naphthalene rings acting as energy sinks to dissipate absorbed radiation energy as heat and light.

One preparative route to naphthalene-2,6-dicarboxylic acid is the Henkel disproportionation of potassium napthoates in the presence of a catalyst such as a salt or oxide of cadmium, zinc or mercury by heating to a temperature of 300° to 530°C under a carbon dioxide pressure of 50 to 7,000 psig. The mixture obtained as the product of this reaction contains dipotassium-2, 6-naphthalene-dicarboxylate, isomers thereof, naphthoates and potassium carbonate.

2. Description of the Prior Art

U.S. Pat. No. 3,243,458 describes a method for isolating naphthalene-2,6-dicarboxylic acid from naphthoic acids by dissolving their neutral alkali salts in a solvent such as methanol and precipitating out the pure 2,6-dicarboxylate by the addition of a suitable antisolvent such as benzene. However, the mixture of salts produced by the above-mentioned disproportionation reaction does not dissolve appreciably in methanol or ethanol — probably because of the insolubility of the 2,6-dicarboxylate — and no solid precipitates from the decanted liquor upon adding benzene.

U.S. Pat. No. 3,209,024 describes a pretreatment wherein mixed naphthalene dicarboxylic acids obtained by the liquid phase partial oxidation of mixed dimethylnaphthalenes are first extracted with an alcoholic solvent which selectively removes certain interfering impurities including naphthalene aldehyde monoacids from the mixed diacids. The diacids are then converted to their dipotassium or dicesium salts which undergo the Henkel rearrangement. After completion of the reaction, the products are extracted with ethyl ether to remove naphthalene and other ether — soluble products. The dipotassium or dicesium naphthalene 2,6-dicarboxylate which are insoluble in ether are dissolved in water and the aqueous solution is acidified to precipitate the desired acid product. Undesirable potassium or cesium ions are lost in the form of the chloride. As these ions constitute the most expensive materials in the process their loss militates strongly against the commercial acceptance of the process.

SUMMARY OF THE INVENTION

An improvement has now been found in Henkel reaction conditions whereby the crude mixture of products resulting from the rearrangement is extracted by heating the mixture in an extract system composed of a major amount of a water-miscible organic solvent and a minor amount of water. The desired dipotassium or dicesium naphthalene-2,6-dicarboxylate is precipitated from the extract system and removed therefrom. The solvent is then evaporated from the extract system to give a mixture of products having a potassium or cesium ion including potassium or cesium carbonate and naphthoates. These salts are then recharged to the rearrangement reaction where they undergo rearrangement to the desired 2,6-dicarboxylate. The carbonate in the mixture is neutralized with fresh naphthoic acid which is the basic feed in the Henkel reaction so that there is no loss of alkali metal ion.

The extractive step herein is applied to the alkali metal salts before acidification and not to the acids afterwards as in the prior art.

In one embodiment of the present process the mixture of products is mixed with the calculated amount of boiling water to give a thin paste which is slurried by addition of the selected organic solvent. After stirring, the slurry is filtered and the solids are dried.

In another embodiment of the present process, the mixture of products is refluxed in the extract system, at the reflux temperature thereof, cooled to ambient temperature and the product is centrifuged. Preferably the ratio of the volume of extracting liquid to the weight of solid mixture ranges from about 10:1 to about 4:1. The free acid is liberated by treating the salt with weak acid.

DESCRIPTION OF SPECIFIC EMBODIMENTS

Generally any solvent in which potassium naphthoates are soluble can be used in the practice of this invention. Preferred solvents include ethanol, methanol, isopropanol, isobutanol, amyl alcohol, butanol, and acetone. The proportion of solvent in the extract system ranges from about 75% to about 95% by volume. Generally, 5 to 10 liters of extracting liquid should be used per kilo of solid mixture.

The following examples are presented to more fully illustrate the invention:

EXAMPLE 1

In a typical disproportionation reaction the potassium naphthoates (19.2 g.) are mixed with cadmium oxide catalyst (0.8 g.) and charged to a 50 ml. pressure reactor. The vessel is evacuated for 5 hr. at 200°C. to dry the reactants completely. It is then pressured to 300 psig. with carbon dioxide, immersed in a lead bath, and maintained at 420°C. for 4 hours. The reactor is air cooled, opened and the contents extracted with hot water which is then filtered to remove the catalyst. The aqueous extract containing the potassium salts is concentrated to small volume and treated with the desired amount of alcohol. The slurry is filtered and the filter cake washed with aqueous alcohol. Results obtained with various proportions of water and alcohol are given in Table I.

TABLE I

SEPARATION OF POTASSIUM NAPHTHALENE-2,6-DICARBOXYLATE
FROM OTHER POTASSIUM NAPHTHALENE CARBOXYLATES

| Concentration of EtOH in Solvent (% v/v) | K-Salts Content in Slurry (% w/v) | 2,6-K$_2$NDCA$^a$ in Charge (% w/w) | 2,6-K$_2$NDCA$^a$ in Product (% w/w) | Recovery of 2,6-K$_2$NDCA$^a$ (% w$^2$/w) |
|---|---|---|---|---|
| 75 | 10 | 85 | 98 | 85 |
| 90 | 10 | 85 | 99 | 99 |
| 90 | 10 | 57 | 75 | 99 |
| 90 | 10 | 37 | 57 | 99 |
| 75 | 20 | 85 | 99 | 91 |
| 90 | 20 | 85 | 99 | 100 |
| 90 | 3 | 75 | 78 | 82 |

$^a$K$_2$NDCA = dipotassium naphthalene-dicarboxylate.

EXAMPLE 2

A mixture of potassium naphthalene carboxylates, 20.0 g., containing 2,6-dicarboxylate, 16.58 g., naphthoates, 2.82 g., and potassium carbonate, 0.40 g., was mixed with boiling water, 10 ml., to give a thin paste. Ethanol, 90 ml., was then added and the resulting slurry stirred for 30 minutes. The slurry was then filtered with suction, and dried in an oven at 110°C. The recovered solid, 17.16 g., contained 2,6-dicarboxylate, 16.56 g., naphthoates, 0.24 g., and carbonate 0.36 g. This corresponds to a recovery of 100% w/w of the 2,6-dicarboxylate, with purity increased from 85% w/w of the naphthalene carboxylates to 99% w/w.

The potassium carbonate content was determined by titrimetric analysis, and the distribution of the naphthalene carboxylates was obtained by Gas Liquid Chromatography on the methyl ester derivatives.

EXAMPLE 3

This example illustrates the efficiency of various extract systems. The method used to test the efficiency of the various solvent systems was as follows: 10 g. of the product from the potassium naphthoate disproportionation reaction was refluxed with 50 mls. of the solvent for an hour. The anhydrous solvents and mixtures containing 9% v/v and 20% v/v water were used to obtain the results in the appended table. At the end of this time the mixture was cooled to ambient temperature, and the product centrifuged. A 10 mls. sample of the clear liquid phase was treated with standard hydrochloric acid to methyl orange end point. This gave the amount of potassium carbonate directly. The mixture was then completely transferred to a weighed flask and dried down by evaporation - finally using a vacuum pump and a water bath. Reweighing gave the amount of potassium carboxylates present plus potassium chloride. A sample of this dried product was esterified with 12% boron trifluoride in methanol. After ethylene chloride extraction, the esters in solvent were submitted for Gas Liquid chromatography analyses.

TABLE II

| | G. Potassium Salts in 10 ml. Extract Solution | | | | | |
|---|---|---|---|---|---|---|
| | Total | Carbonate | Naphthoate | Other KNDCA | 2:6 KNDCA | Other KNDCA |
| Starting material | 1.000 | 0.394 | 0.324 | 0.020 | 0.236 | 0.026 |
| Extract System | | | | | | |
| Ethanol | 0.287 | 0.036 | 0.251 | 0 | 0 | 0 |
| Methanol | 0.997 | 0.050 | 0.947 | 0 | 0 | 0 |
| Isopropanol | 0.142 | 0.025 | 0.117 | 0 | 0 | 0 |
| Isobutanol | 0.228 | 0.031 | 0.197 | 0 | 0 | 0 |
| Amyl alcohol | 0.115 | 0.056 | 0.059 | 0 | 0 | 0 |
| EtOH(10 vol.), H$_2$O(1 vol.) | 0.877 | 0.257 | 0.620 | 0 | 0 | 0 |
| MeOH(10) vol., H$_2$O(1) vol. | 1.042 | 0.364 | 0.678 | 0 | 0 | 0 |
| iProH(10) vol., H$_2$O(1) vol. | 0.256 | 0.216 | 0.040 | 0 | 0 | 0 |
| AcMe(10) vol., H$_2$O(1) vol. | 0.142 | 0.068 | 0.074 | 0 | 0 | 0 |
| tBuOH(10) vol., H$_2$O(1) vol. | 0.327 | 0.157 | 0.170 | 0 | 0 | 0 |
| iBuOH(10) vol., H$_2$O(1) vol., | 0.389 | 0.187 | 0.202 | 0 | 0 | 0 |
| MeOH(4) vol., H$_2$O(1) vol. | 1.306 | 0.632 | 0.535 | 0.010 | 0.080 | 0.049 |
| EtOH(4) vol., H$_2$O(1) vol. | 1.085 | 0.420 | 0.553 | 0.010 | 0.081 | 0.021 |
| iPrOH(4) vol., H$_2$O(1) vol. | 1.004 | 0.363 | 0.470 | 0.025 | 0.093 | 0.053 |

TABLE II—Continued

G. Potassium Salts in 10 ml. Extract Solution

|  | Total | Carbonate | Naphthoate | Other KNDCA | 2:6 KNDCA | Other KNDCA |
|---|---|---|---|---|---|---|
| AcMe(4) vol., H₂O(1) vol. | 1.307 | 0.549 | 0.588 | 0.023 | 0.098 | 0.049 |
| iBuOH(4) vol., H₂O(1) vol. | 1.287 | 0.394 | 0.747 | 0.024 | 0.104 | 0.018 |
| AmOH(4) vol., H₂O(1) vol. | 1.323 | 0.339 | 0.824 | 0.035 | 0.095 | 0.030 |

[a] KNDCA: potassium naphthalene-2,6-dicarboxylate.

The solvent systems used were methyl, ethyl, isopropyl, isobutyl and t-butyl alcohols as well as acetone. These results show that the anhydrous solvents extract the potassium naphthoate and some potassium carbonate but no naphthalene dicarboxylates. Addition of 9% v/v water increases the amount of potassium carbonate dissolved, but no dicarboxylates are present in the filtrate. A still further increase in the water content to 20% v/v causes some of the dicarboxylates to be dissolved.

These data show that the solvent/water systems studied all preferentially dissolve both potassium naphthoate and potassium carbonate from the potassium naphthalene 2,6-dicarboxylate.

What is claimed is:

1. In the preparation of dipotassium naphthalene 2,6-dicarboxylate by heating potassium naphthoates in the presence of potassium carbonate and of a catalyst consisting of a salt or oxide of calcium, zinc or mercury to a temperature of about 300° to 530°C. under a carbon dioxide pressure of 50 to 7,000 psig; the steps of extracting the reaction mixture with hot water; concentrating the resulting aqueous extract; adding ethanol to the concentrate to form an extract system separating dipotassium naphthalene-2,6-dicarboxylate from said ethanol and recycling the salts thus obtained to the reaction mixture.

2. The process according to claim 1, including the steps of adding sufficient boiling water to said mixture to give a thin paste; adding enough aqueous ethanol to form a slurry, and filtering said slurry to isolate said dipotassium naphthlene-2,6-dicarboxylate as a solid.

3. The process according to claim 1, including the steps of refluxing said mixture at the reflux temperature of said extract system; cooling to ambient temperature and centrifuging off the dipotassium naphthalene-2,6-dicarboxylate from the solution.

4. The process according to claim 1, wherein the proportion of solvent in said extract system ranges from about 75% to about 95% by volume.

5. The process according to claim 1, wherein said mixture is first treated with hot water and filtered to remove said catalyst, the water extracts then being concentrated.

* * * * *